（12） United States Patent
Haug et al.

(10) Patent No.: US 11,229,973 B2
(45) Date of Patent: Jan. 25, 2022

(54) DETECTION OF HOT CRACKS IN LASER WELDING

(71) Applicant: TRUMPF Laser- und Systemtechnik GmbH, Ditzingen (DE)

(72) Inventors: Patrick Haug, Gerlingen (DE); Tim Hesse, Ditzingen (DE); Steffen Kessler, Stuttgart (DE); Marcel Schäfer, Ditzingen (DE); Philipp Scheible, Illingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 603 days.

(21) Appl. No.: 16/133,923

(22) Filed: Sep. 18, 2018

(65) Prior Publication Data

US 2019/0022793 A1 Jan. 24, 2019

Related U.S. Application Data

(63) Continuation of application No. PCT/EP2017/055855, filed on Mar. 13, 2017.

(30) Foreign Application Priority Data

Mar. 18, 2016 (DE) .......................... 102016204577.6

(51) Int. Cl.
*B23K 26/03* (2006.01)
*B23K 26/24* (2014.01)
(Continued)

(52) U.S. Cl.
CPC .......... *B23K 26/032* (2013.01); *B23K 26/034* (2013.01); *B23K 26/0626* (2013.01);
(Continued)

(58) Field of Classification Search
CPC .. B23K 26/032; B23K 26/0626; B23K 26/24; B23K 31/003; B23K 31/125;
(Continued)

(56) References Cited

U.S. PATENT DOCUMENTS 6,900,410 B2 5/2005 Tsukamoto et al.
9,506,862 B2 11/2016 Kobayashi et al.
(Continued)

FOREIGN PATENT DOCUMENTS

CN 101391344 3/2009
CN 101730607 6/2010
(Continued)

OTHER PUBLICATIONS

KR Notice of Allowance in Korean Appln. No. 10-2018-7030150, dated Jun. 25, 2020, 6 pages (with English translation).
(Continued)

*Primary Examiner* — Phuong T Nguyen
(74) *Attorney, Agent, or Firm* — Fish & Richardson P.C.

(57) ABSTRACT

Methods for determining the quality of a weld of a workpiece welded by laser-beam welding, wherein at least a partial region of a molten pool and/or of a surrounding area of the molten pool is observed by means of a measuring system during the laser-beam welding and the quality of the weld of the welded workpiece is determined on the basis of the observation result. At least one characteristic value that correlates with molten pool oscillation of the molten pool is observed during the laser-beam welding and a measure of an amplitude of the molten pool oscillation and/or a measure of a frequency of the molten pool oscillation is determined from the observed time curve of the characteristic value. A probability and/or a frequency for the occurrence of hot cracks at the weld of the workpiece is inferred.

16 Claims, 10 Drawing Sheets

(51) Int. Cl.
*B23K 31/12* (2006.01)
*B23K 26/70* (2014.01)
*B23K 26/06* (2014.01)
*B23K 31/00* (2006.01)
*B23K 103/04* (2006.01)

(52) U.S. Cl.
CPC .............. *B23K 26/24* (2013.01); *B23K 26/70* (2015.10); *B23K 26/702* (2015.10); *B23K 31/003* (2013.01); *B23K 31/125* (2013.01); *B23K 2103/04* (2018.08)

(58) Field of Classification Search
CPC ............. B23K 26/702; B23K 2103/04; B23K 26/082; B23K 26/22; B23K 26/06
USPC ............................ 219/121.6, 121.63, 121.64
See application file for complete search history.

(56) References Cited

U.S. PATENT DOCUMENTS

| | | | |
|---|---|---|---|
| 2004/0026381 A1* | 2/2004 | Tsukamoto | B23K 26/06 219/121.6 |
| 2016/0061727 A1* | 3/2016 | Kobayashi | G01N 33/205 356/445 |
| 2019/0022793 A1 | 1/2019 | Haug et al. | |

FOREIGN PATENT DOCUMENTS

| | | |
|---|---|---|
| CN | 104655564 | 5/2015 |
| CN | 105290576 | 2/2016 |
| DE | 4106007 | 9/1992 |
| DE | 10338062 | 4/2005 |
| DE | 102007024789 | 10/2008 |
| DE | 112010003406 | 11/2012 |
| DE | 102012021755 | 5/2014 |
| DE | 102013015656 | 3/2015 |
| DE | 102014107716 | 6/2015 |
| DE | 102016204577 | 7/2019 |
| EP | 1 726 397 | 11/2006 |
| EP | 2094429 | 5/2012 |
| EP | 2543464 | 1/2013 |
| EP | 3429794 | 1/2019 |
| JP | H08 90265 A | 4/1996 |
| KR | 2015-0119961 | 10/2015 |
| WO | WO 2014/138939 | 9/2014 |
| WO | WO 2017/157856 | 9/2017 |

OTHER PUBLICATIONS

Heider et al., "Power modulation to stabilize laser welding of copper," Journal of Laser Applications, 2015, 27: 022003.
International Search Report and Written Opinion in International Application No. PCT/EP2017/055855, dated Jul. 18, 2017, 24 pages (with English translation).
Schafer et al., "Analyzing Hot Crack Formation in Laser Welding of Tempered Steel," Lasers in Manufacturing Conference 2015, 2015, 7 pages.
Schneider, "Von Werkzeugstahl bis zur Superlegierung : Effizientes und prozessstabiles Laserschweißen im dreidimensionalen Raum," Laser Technik Journal, 2013, 10: 24-27 (with English translation).
Stritt et al., "Heißrisskriterium für das randnahe Laserstrahlschweißen von Aluminium," Workshop—Heißrissbildung beim Laserstrahlschweißen, Stuttgart, 2014, 27 pages (with English translation).
Stritt, Remote Laserstrahlschweißen von Aluminium—Modellierung und Experiment, VEDIS-Treffen, 2013, 32 pages (with English translation).
Weberpals et al., Laser Beam Remote Welding of Aluminum Hang-On Parts, EALA, 2015, 19 pages.
CA Office Action in Canadian Appln. No. 3,016,382, dated Sep. 4, 2019, 3 pages.
CN Office Action in Chinese Appln. No. 2017800181140.0, dated Oct. 8, 2019, 11 pages (with English translation).

* cited by examiner

DETECTION OF HOT CRACKS IN LASER WELDING

CROSS REFERENCE TO RELATED APPLICATIONS

This application is a continuation of and claims priority under 35 U.S.C. § 120 from PCT Application No. PCT/EP2017/055855 filed on Mar. 13, 2017, which claims priority from German Application No. DE 10 2016 204 577.6, filed on Mar. 18, 2016. The entire contents of each of these priority applications are incorporated herein by reference.

TECHNICAL FIELD

The disclosure relates to methods for determining the quality of a weld seam of a workpiece welded by a laser beam.

BACKGROUND

Laser beam welding is used for welding workpieces that are to be produced rapidly (at a high advance speed) or are to be subjected to only slight thermal distortion. Using laser beam welding, narrow and slim weld seam forms can also be produced.

During laser beam welding, a so-called molten bath of molten workpiece material is produced on the workpiece around the focal spot of the laser beam. This molten bath substantially moves with the laser beam as it propagates relative to the workpiece; remote from the laser beam, the workpiece material solidifies again. The workpiece material which has solidified again forms a weld seam.

During the solidification of the workpiece material, so-called hot cracks may be formed. The hot cracks may significantly impair the strength of the weld seam. The knowledge relating to the appearance of hot cracks in a weld seam is an important piece of information relating to the quality of the weld seam or the workpiece as a whole.

On a completely welded workpiece, the hot cracks in the weld seam in general cannot be seen with the naked eye. Hot cracks are generally detected by fractured surface samples on a completely welded workpiece by scanning electron microscopic examinations. Hot cracks can also be identified by X-ray imaging or ultrasound examinations of the workpiece. However, these methods are time-consuming and labor-intensive.

DE 10 2007 024 789 B3 discloses a method for identifying defects in a weld seam during a laser welding process, wherein there is detected in a spatially resolved manner radiation emitted by a solidified melt adjacent to a liquid molten bath. By evaluating the detected radiation along a profile section of the solidified melt, a characteristic value for a heat dissipation is determined and a defect is identified by comparison with a reference value.

EP 2 094 429 B1 described a method for process monitoring during laser welding. In this instance, the radiation emitted from the capillary, the molten bath and the solidified melt is detected in a spatially resolved manner at least at two wavelengths. Using the method, the quality of the processing process and the weld seam produced can be monitored.

DE 11 2010 003 406 T5 discloses monitoring and analyzing the weld quality of a weld portion and the surrounding region thereof using a high-speed camera. The analyzed parameters such as, the number of weld spatters, are compared with comparison tables. DE 10 2014 107 716 B3 describes spatially oscillating a laser beam during laser welding and dynamically adapting the oscillation parameters during the welding process in such a manner that weld spatters detected by a camera are reduced.

DE 41 06 007 A1 describes detecting optical or acoustic signals originating from the plasma or vapor produced during laser welding and subjecting them to a frequency analysis to monitor the welding penetration depth and the degree of through-welding. EP 2 543 464 A2 proposes during laser welding subjecting the radiation of a plasma originating from the welding zone to a frequency analysis and using an active optical element configuring the laser beam in accordance with the analysis, for instance with regard to the focal length, so that the weld quality is optimized.

DE 10 2013 015 656 A1 discloses a method for measuring the penetration depth of a laser beam into a workpiece by optical coherence tomography (OCT), wherein a first measurement beam is directed onto the still-unprocessed workpiece and a second measurement beam is directed onto the weld capillary. Depending on the measured penetration depth, a parameter of the laser processing can be changed. An interferometric measurement of a capillary depth during laser welding is also known from WO 2014/138939 A1.

US 6,900,410 B2 describes a method for laser beam welding, wherein the laser power is modulated in a pulsed manner, and wherein the modulation frequency corresponds to a natural oscillation frequency of the molten bath. Weld defects, e.g., cracks, are thereby prevented. The laser welding was carried out on steel plates.

In "Von Werkzeugstahl bis zur Superlegierung" ("From Tool Steel to Super Alloy" by M. Schneider), Laser-Journal 4/2013, pp. 24-27, it is proposed during laser beam welding to use a pulsed laser, and using thermal pulse formation to carry out an adaptation to the absorption behavior of the material. Using post pulse phases, hot cracks are prevented. Furthermore, by modulation of the laser power, the molten bath dynamic and consequently the solidification morphology can be influenced.

SUMMARY

The present disclosure provides simplified methods to analyze the quality of weld seams on laser-welded workpieces.

In some embodiments, during the laser beam welding operation, at least one parameter of a molten bath that correlates to a molten bath oscillation is monitored and, from the monitored time progression of the parameter, a measurement variable for an amplitude of the molten bath oscillation and/or a measurement variable for a frequency of the molten bath oscillation is/are established. From the measurement variable for the amplitude of the molten bath oscillation and/or the measurement variable for the frequency of the molten bath oscillation conclusions are drawn relating to a probability and/or a frequency of occurrence or the appearance of hot cracks in the weld seam of the workpiece.

As described herein, molten bath oscillations correlate to the appearance of hot cracks. Monitoring of the frequency of molten bath oscillations (for example, directly measured by the molten bath length or indirectly measured by a grey value at a fixed point in the molten bath or in the heat track) corresponds to the frequency of hot cracks that occur. Furthermore, it has been found that with laser beam welding in which the molten bath oscillations have a small or negligible amplitude, hot cracks occur less often or can be prevented completely. From the behavior of the molten bath when the laser welding operation is carried out (e.g., from a measurement variable for the amplitude and a measurement variable for the frequency of the molten bath oscillation), these monitored correlations can be used to draw conclusions regarding the tendency to crack or the probability and the frequency of occurrence for the appearance of hot cracks in the welded weld seam.

The weld bath oscillation is a substantially periodic increase and decrease of the molten bath, which generally occurs during laser beam welding (unless counter-measures are taken) regardless of any weld spatters.

The methods described herein can be used with comparatively simple measurement systems during the laser welding process, enabling particularly rapid quality assessments. It is not necessary to prepare a workpiece in a specific manner after the welding is completed (for example, to prepare a fracture surface or a cross section polish) or to move it into a specific measurement apparatus (for instance, a scanning electron microscope, an X-ray apparatus or an ultrasound measurement station).

To monitor parameters that allow conclusions to be drawn relating to the molten bath oscillations, it is possible to use measurement systems that receive signals from process regions, such as the molten bath and/or heat track (e.g., when the laser power is modulated). In the case where no modulation of the laser power takes place, a signal can also be evaluated from the process region of the vapor capillary of the welding process. The measurement systems can monitor passively (for instance, a thermal imaging camera) or also provide (e.g., radiate) a measurement signal from outside that cooperates with the workpiece or the workpiece surface and which is then detected with the measurement system (for instance, with a white light interferometer). The measurement systems can be integrated on or in an optical welding unit and be moved with the optical welding unit. In general, for monitoring the at least one parameter, at least a part region of the molten bath and/or an environment of the molten bath is monitored with the measuring system.

For example, the following method steps can be carried out:

(1) detecting heat radiation using
  (a) a (sufficiently rapid) camera (visible, near infrared, infrared),
  (b) a pyrometer which is directed to a location in the melt or the solidified heat track, or
  (c) a photodiode which is directed onto the focal spot/the capillary,
(2) detecting radiation that has been reflected by illumination of the process zones using a camera,
(3) detecting an interference signal whose measurement beam is directed towards the capillary using a white light interferometer,
(4) detecting a spectrum of the focal spot using a spectrometer, and/or
(5) detecting structure-borne noise or airborne noise.

Exemplary measurement parameters enabled by the above individual measuring methods are:

(1a, 2) the molten bath length, the molten bath width, the molten bath surface-area in the thermal image,
(1a) the decay length, the heat track width in the heat track in the thermal image,
(1a, b, c) the gray values/detected intensities and/or temperature values at local positions which are fixed relative to the focal spot in capillary, melt or heat track,
(3) the depth assessments of the signals from the capillary or the capillary depth.

With reference to the measurement variables for the frequency and the amplitude of the molten bath oscillation established from the parameter, the tendency to crack can be quantified or an occurrence of a crack can be detected.

Typically, from the time progression of the parameter monitored with the measuring system, both the measurement variable for the amplitude and the measurement variable for the frequency of the molten bath oscillation are established. However, it is also possible to establish only the measurement variable for the amplitude of the molten bath oscillation, e.g., when only the probability of the appearance of hot cracks is relevant. It is also possible to establish only the measurement variable for the frequency of the molten bath oscillation, e.g., when only the frequency of occurrence of hot cracks is relevant or when the appearance thereof is already otherwise known.

When the frequency (or the frequency interval) of the molten bath oscillation is already known with sufficient precision (for instance, from a previous test, typically without power modulation of the laser), the evaluation of the time progression of the parameter can also be limited to the determination of the measurement variable for the amplitude of the molten bath oscillation (for instance, by determining the fluctuation range of the parameter).

The measurement variable for the amplitude increases as the amplitude of the molten bath oscillation increases, e.g., directly proportionally, and vice versa. This applies accordingly to the measurement variable of the frequency; generally, the measurement variable of the frequency corresponds directly to the frequency of the molten bath oscillation.

Generally, a higher amplitude of the molten bath oscillation increases the probability of the appearance of hot cracks, and vice versa. Generally, a higher frequency of the molten bath oscillation also increases the frequency of occurrence of the appearance of hot cracks (generally with direct proportionality), and vice versa.

In practice, the molten bath oscillation generally occurs in a frequency band. This frequency band can be considered on the whole to draw conclusions relating to the probability and/or frequency of occurrence of hot crack formation. Where applicable, totaling can be carried out over the frequency components (intensities) in this frequency band to obtain the parameter for the amplitude of the molten bath, and for the parameter of the frequency of the molten bath a mean frequency of the frequency band can be formed. The term "frequency" thus also refers to this frequency band and the mean frequency thereof.

The determination of the quality of a weld seam typically relates to the weld seam of a workpiece as a whole, wherein the entire production of the weld seam was monitored. However, it is also possible to monitor and assess only a weld seam portion of an entire weld seam during the production.

The method can be used to assess axial round seams or radial round seams. Workpieces examined can be gear components (such as ratchet wheels or intermediate shafts) or laser welded steel pistons.

In some implementations for determining the probability and/or frequency of occurrence for the appearance of hot cracks, the measurement variable for the amplitude of the molten bath oscillation is compared with at least one threshold value, wherein, with a measurement variable for the amplitude of the molten bath oscillation above a saturation threshold value, it is assumed that a hot crack (or at least one hot crack) always occurs in the workpiece per amplitude maximum. This procedure is simple and rapid to use. The threshold value(s) can be established by prior tests in which both the behavior of the weld bath was monitored and the actual hot cracks that have formed have been established (for instance, via X-ray images). The measurement variable for the amplitude can be normalized prior to the comparison with the threshold value, for instance, with an average amplitude of all monitored frequency components in the molten bath. It may be noted that it is further possible, for determining the probability and/or frequency of occurrence for the appearance of hot cracks, to compare the measurement variable for the frequency of the molten bath oscillation with at least one threshold value.

In some embodiments, the laser beam welding is carried out at a laser power that is modulated at a modulation frequency f and a modulation amplitude $\pi C$, with $\pi=1-P_{min}/P_{max}$, where $P_{min}$ is the minimum laser power during a modulation period and $P_{max}$ is the maximum laser power during a modulation period. By modulation of the laser power during the laser beam welding, provided there is an appropriate modulation frequency f, modulation amplitude $\pi$ and mean (average) laser power $P_{av}$, the formation of hot cracks can be considerably reduced or even prevented. With the method, the success of the power modulation with regard to the weld seam quality can be estimated in a simple and rapid manner. For a low probability of hot cracks the modulation frequency f can be significantly greater than the frequency of the characteristic molten bath oscillation (which occurs in the unmodulated case), for example, at least by a factor of 2, or by a factor between 2 and 8. Typically, $P_{min}>0$. Typically, the modulation frequency f and (normalized) modulation amplitude $\pi$ are constant during the production of a workpiece; at the weld seam start and weld seam end, however, the average laser power $P_{av}$ is generally raised or lowered, respectively.

In some embodiments, the laser power is substantially modulated in a sinusoidal manner, wherein the sinusoid is approximated by at least 12, or by at least 18, base points per modulation period. As a result of the sinusoid, high frequency components in the modulation are prevented, which has been found to be favorable for a low probability of hot cracks. The use of base points is particularly simple. Alternatively, a pulsed modulation can also be used.

In some embodiments, the workpiece is steel. Using steel materials, including tempering steels and case hardening steels, particularly reliable statements relating to the tendency for cracking can be made. The laser is typically a solid-state laser, for instance, an Nd-YAG or a Yb-YAG laser.

In some embodiments, the at least one parameter includes a geometric size of the molten bath, which is detected with a camera. The direct monitoring of a molten bath size is particularly reliable and also possible in a simple manner. The camera can, for example, detect visible light or infrared (IR) light. The camera is typically oriented coaxially with respect to the laser beam.

In some embodiments, the geometric size is a molten bath length, a molten bath width, or a molten bath surface-area. The molten bath length has comparatively large fluctuations with the molten bath oscillation and is in this regard a good indicator for the molten bath behavior. The molten bath surface-area (the size of the molten bath surface) enables particularly reliable statements relating to the molten bath oscillation. For the establishment of the molten bath width, in most cases only a relatively small image detail need be monitored.

The at least one parameter can include a local temperature in the molten bath or in a heat track of the molten bath at a location on the workpiece that is fixedly positioned and spaced apart with respect to a laser beam focal spot, wherein the local temperature is detected by pyrometer or a thermal imaging camera. The local temperature measurement (monitoring) is particularly simple. The location of the temperature measurement is typically spaced apart with a spacing corresponding to at least twice the diameter of the laser beam focal spot (e.g., by at least ¼ of the smallest molten bath length) from the laser beam focal spot; this spacing reduces the risk of corruption of the measurement as a result of power modulation. The location of the temperature measurement moves with the laser beam on the workpiece.

In some embodiments, the parameter includes a geometric size of a weld capillary over a laser beam focal spot, wherein the geometric size of the weld capillary is determined using a measurement beam and a white light interferometer. The boundary between metal vapor and melt at the edge of the weld capillary provides powerful contrasts that can be readily detected by the measurement methods described herein. Measurements on the capillary (for instance, a measurement of the capillary depth) are used when the laser power is constant or unmodulated; otherwise, with higher modulation amplitudes, there is the risk of measuring only the power modulation, but not the actual melt bath oscillation.

The monitored time progression of the parameter can be subjected to a Fourier transformation. Using the Fourier transformation, the measurement variable for the amplitude and the measurement variable for the frequency of the molten bath oscillation can be established in a simple manner. The molten bath oscillation typically includes (or causes) the most powerful frequency component that occurs in the Fourier spectrum. The measurement variable of the amplitude of the molten bath oscillation is typically normalized, for instance, by the amplitude of the frequency component (or frequency components) that belongs to the molten bath oscillation in the Fourier spectrum with the average amplitude of all frequency components in the Fourier spectrum before conclusions are drawn relating to the probability and/or frequency of occurrence of the appearance of hot cracks. As an alternative to a Fourier transformation, it is possible, for example, to determine a measurement variable for a maximum amplitude of the molten bath oscillation by the fluctuation width of the parameter along the weld seam.

Methods for Optimizing Production Parameters of Welded Workpieces

The scope of the present description also includes methods for optimizing one or more production parameters of welded workpieces, wherein a plurality of workpieces are welded along a weld seam by laser beam welding, wherein the workpieces are each produced with different values of a production parameter or value combinations of a plurality of production parameters, wherein for the workpieces in each case the probability and/or the frequency of occurrence for the appearance of hot cracks in the weld seam is determined as described above, wherein at least one best workpiece from the plurality of workpieces is established, by whose value or value combination of the production parameter(s) a lowest probability and/or a lowest frequency of occurrence for the appearance of hot cracks in the weld seam was obtained, and wherein the value or the value combination of the best workpiece is used as a basis for determining the optimum production parameters.

Consequently, it is possible in a simple and rapid manner to determine optimum production parameters for a type of workpiece forming the basis of the methods to minimize the appearance of hot cracks. In the simplest case, the value or the value combination of the best workpiece is determined directly as optimum production parameters. In the individual case, derived optimum production parameters can also be considered. For instance, a modulation frequency f which has been changed with respect to the best workpiece at an advance speed v which has also been changed, with the standardized modulation frequency Λ being maintained, with Λ=f·$d_f$/v, where $d_f$ is the diameter of laser beam focal spot. If a plurality of workpieces have the same lowest probability and/or the same smallest frequency of occurrence for the appearance of hot cracks (e.g., a probability of "zero"), these may all be understood to be "best" workpieces. The optimum production parameters may be used for a standardized production (batch production) of the workpieces with minimized hot cracks. Typical production parameters which have to be optimized are the (average) laser power, the advance speed, a modulation frequency, a modulation amplitude, the beam parameter product and many more.

In some embodiments, the laser beam welding of a respective workpiece to be carried out at a laser power which is modulated at a modulation frequency f and a modulation amplitude π, with π=1−$P_{min}$/$P_{max}$, where $P_{min}$ is the minimum laser power during a modulation period and $P_{max}$ is the maximum laser power during a modulation period, and, with the respective workpieces, for different value combinations of modulation frequency f and modulation amplitude π to be used as production parameters. By modulating the laser power, the molten bath oscillation can be powerfully influenced, or the tendency to crack can be significantly changed. As a result of the method, an optimum value combination of modulation frequency f and modulation amplitude π can be determined. Advantageously, a mean laser power $P_{av}$ can further also be optimized as a production parameter.

In some embodiments, the best workpiece is established by the workpiece with the smallest measurement variable for the amplitude of the molten bath oscillation of all workpieces being selected. This procedure is particularly simple and makes use of the circumstance that generally a low amplitude of the molten bath oscillation is linked with a low probability of hot crack formation.

Methods for Controlling Production Parameters During the Laser Beam Welding Operation The scope of the present disclosure further includes methods for controlling one or more production parameters during the laser beam welding of a workpiece, wherein the workpiece is welded along a weld seam by laser beam welding, wherein the laser beam welding is carried out in accordance with one or more production parameters, wherein the probability and/or the frequency of occurrence for the appearance of hot cracks in the weld seam is repeatedly determined as described above during the laser beam welding of the workpiece, and wherein the value of the production parameter or the values of the production parameters is/are adjusted during the laser beam welding of the workpiece in such a manner that the probability and/or the frequency of occurrence for the appearance of hot cracks in the weld seam is/are minimized. Since the above methods for determining the quality of the weld seam or the determination of the probability and/or frequency of occurrence for the appearance of hot cracks can already be used during the laser beam welding, they can also be used on already-completed part-portions of still-incomplete weld seams that make an online-control of the production parameters during the production of the weld seam accessible. Consequently, it is possible to optimize the production parameters even during the production of a workpiece and constantly to adapt to any changed circumstances. The quality of completed workpieces or weld seams can thereby be improved.

In some implementations, the laser beam welding of the workpiece to be carried out at a laser power which is modulated at a modulation frequency f and modulation amplitude π, with π=1−$P_{min}$/$P_{max}$, where $P_{min}$ is the minimum laser power during a modulation period and $P_{max}$ is the maximum laser power during a modulation period. The value of the modulation frequency f and/or the value of the modulation amplitude π are adjusted as production parameters during the laser beam welding of the workpiece in such a manner that the probability and/or the frequency of occurrence for the appearance of hot cracks in the weld seam is/are minimized. By modulating the laser power, the molten bath oscillation can be powerfully influenced or the tendency to crack can be significantly changed. As a result of the methods disclosed herein, a suitable value combination of modulation frequency f and modulation amplitude π can be adjusted. Advantageously, a mean laser power $P_{av}$ can further also be adjusted as a production parameter.

In some embodiments, for the repeated determination of the probability and/or the frequency of occurrence for the appearance of hot cracks in the weld seam only the time progression of the parameter since a last adjustment is taken into account, wherein between two adjustments at least five modulation periods of the modulation of the laser power take place. This procedure ensures that the effects of the changed production parameters are also well detected via the parameter. It is also possible after an adjustment to first leave some modulation periods (for example, at least five) out of consideration; in this instance, there are usually at least ten modulation periods between two adjustments.

In some embodiments, the probability and/or the frequency of occurrence for the appearance of hot cracks in the weld seam are minimized by the value of the production parameter or the values of the production parameters being adjusted in such a manner that the measurement variable for the amplitude of the molten bath oscillation is minimized. This procedure is particularly simple and makes use of the circumstance that generally a low amplitude of the molten bath oscillation is linked with a low probability of hot crack formation.

Other advantages of the invention will be appreciated from the description and the drawings. The features mentioned above and those set out below can also be used individually per se or together in any combinations. The embodiments shown and described are not intended to be understood to be a definitive listing, but instead are of an exemplary nature to describe the invention.

DETAILED DESCRIPTION

Figure 1:
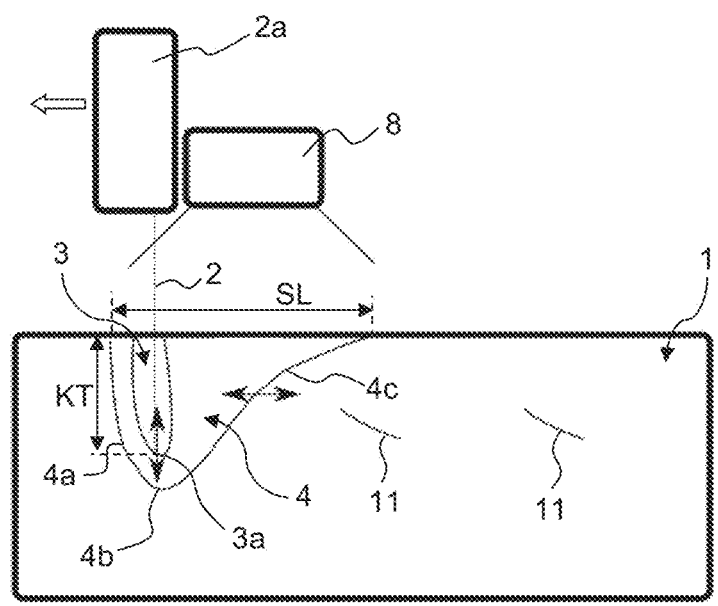
FIG. 1 is a schematic cross-section of a workpiece during laser beam welding.

FIG. 1 is an overview of a welding processing operation of a metal workpiece 1 using a laser beam 2. The laser beam 2 is directed from an optical welding unit 2*a* onto the workpiece 1. The laser beam 2 penetrates the surface of the workpiece 1 and evaporates the workpiece material in the direct vicinity thereof. A metal vapor capillary 3 (also referred to as capillary for short) that forms extends to its bottom 3*a*. In the environment of the capillary 3, the workpiece material is molten and a so-called molten bath 4 of liquid workpiece material is formed. Since the laser beam 2 during welding is moved relative to the workpiece 1, in this instance to the left, the molten bath 4 is sunken to the right in cross-section. At the left edge 4*a* and the lower edge 4*b* of the molten bath 4, workpiece material is being melted, while at the right edge 4*c* of the molten bath 4 workpiece material solidifies again. Hot cracks 11 can occur in the weld seam.

During the laser beam welding operation, the size of the molten bath 4 is not constant but instead fluctuates in an approximately periodic manner (regardless of any weld spatters on the molten bath surface); this phenomenon is known as molten bath oscillation. The molten bath oscillation can be identified from a changeable molten bath length SL. In many cases, the molten bath oscillation correlates to the size of the capillary 3, for instance the capillary depth KT; however, it may be noted that, with a heavily modulated laser power, the molten bath oscillation can be superimposed or dominated by the effects of the power modulation, e.g., close to the capillary 3. The molten bath oscillation is monitored by a measurement system 8 which can be mechanically coupled to the optical welding unit 2*a*.

Figure 2:
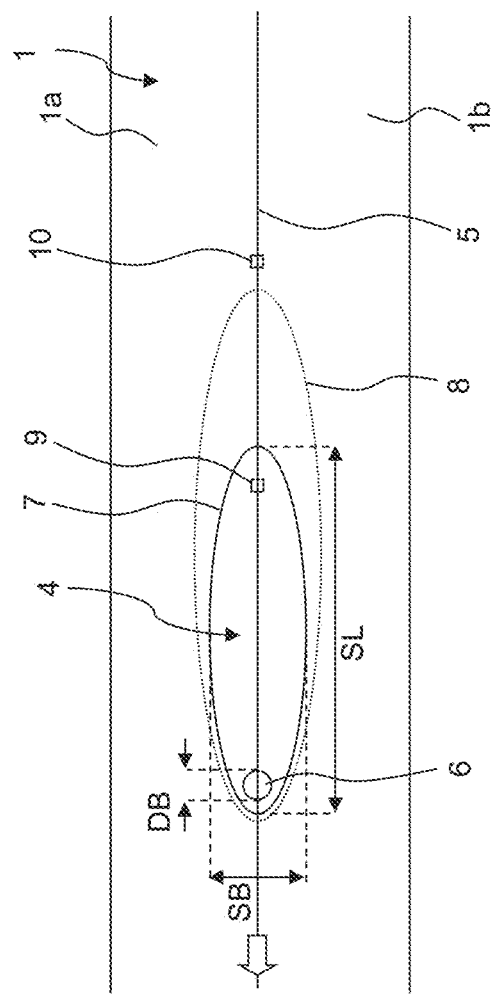
FIG. 2 is a schematic plan view of a workpiece during laser welding.

FIG. 2 is a plan view of the workpiece 1 of FIG. 2 and includes two workpiece portions 1*a*, 1*b* welded along a weld seam 5. The laser beam focal spot 6 is moved to the left relative to the workpiece 1 so that the molten bath 4 is formed primarily at the right-hand side of the laser beam focal spot 6. Its size fluctuates substantially periodically between a smallest extent 7 (illustrated with a solid line) and a largest extent 8 (illustrated with dotted lines).

At least one parameter representing the development of the size of the molten bath is detected over time. The size of the molten bath is simplest to record and is detected directly, such as with a thermal imaging camera. For example, the portion of the surface area of the workpiece whose temperature is above the melting temperature of the workpiece material (or between melting temperature and evaporation temperature) can be detected regularly (e.g., intermittently) or continuously. However, it is generally sufficient to detect, for example, the molten bath length SL or molten bath width SB, for instance as a spacing of the opposing material locations at which the melting temperature (or solidification temperature) is just detected. It is also possible to regularly or continuously detect the temperature at a fixed point 9 relative to the position of the laser beam focal spot 6 in the molten bath 4 or fixed point 10 in a heat track of the molten bath 4. Typically, the fixed points 9, 10 are spaced apart by a multiple (for example, at least two times or at least four times) the diameter DB of the laser beam focal spot 6 from the edge of the laser beam focal spot 6, or spaced apart by at least ¼ of the smallest molten bath length SL (e.g., the width of extent 7) in the weld direction from the edge of the laser beam focal spot 6. The fixed points 9, 10 can, but do not have to be, located in the center of the weld seam 5.

Figure 3:
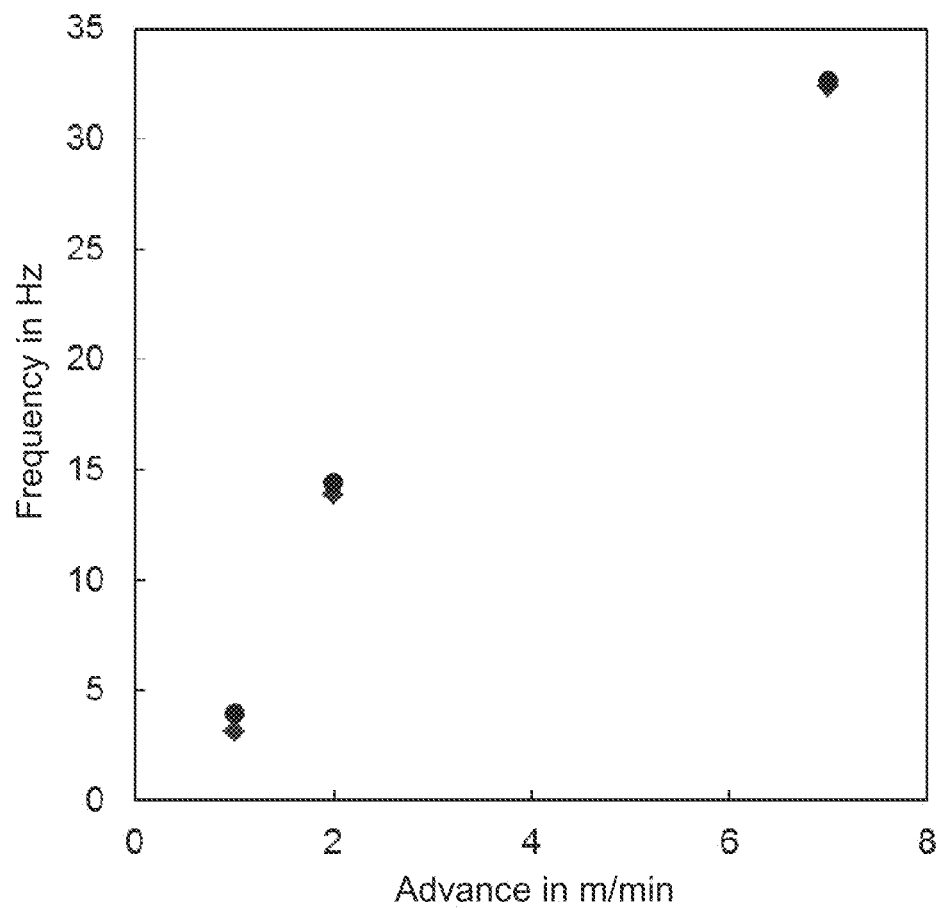
FIG. 3 is a graph with experimentally established frequencies (on the y-axis) of hot cracks (diamonds) and molten bath oscillations (circles) at different laser advance speeds (on the x-axis).

For FIG. 3, different weld seams on workpieces of steel (Type 42CrMoS4) were produced with a Yb-YAG laser, with a weld penetration depth (EST) of 4 mm and a beam parameter product (SPP) of 16 mm*mrad, with different advance speeds (on the x-axis). The laser power was unmodulated.

Hot cracks occurred in the weld seams at the frequencies (on the y-axis) marked with diamonds; by dividing by the respective advance speed, the number of hot cracks per length in the weld seam is given.

During the laser welding, the oscillation frequencies of the weld bath (or the frequencies of the solidification structure) were additionally determined; these frequencies are marked with circles.

As can be seen from the graph, the oscillation frequencies of the molten bath and the crack frequencies correspond very well. From this, it can be seen that the molten bath oscillation correlates to the formation of cracks in a manner which can be used for a quality assessment of the weld seam.

Figure 4:
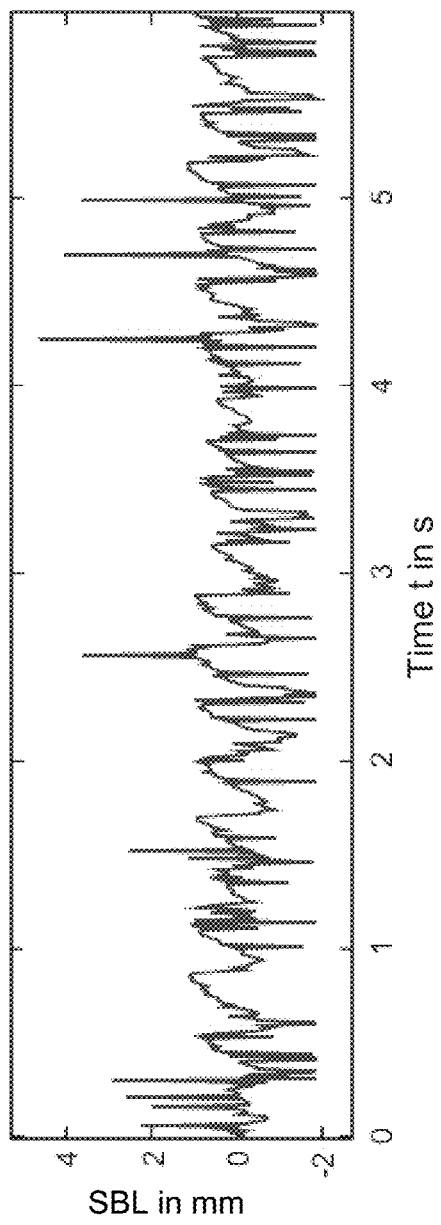
FIG. 4 is a graph illustrating an experimentally determined molten bath length (on the y-axis) as a function of time (on the x-axis) with a workpiece welded at constant laser power.

FIG. 4 shows an example of a molten bath length SBL (on the y-axis) determined thermographically with reference to a thermal decay length as a function of time (on the x-axis). SBL is a parameter for the molten bath oscillation during a laser beam welding operation (again with material steel type 42CrMoS4, a Yb-YAG laser, EST of 4 mm, and SPP of 16 mm*mrad) with a continuous wave laser (cw) that operates without power modulation. It can already be seen with the naked eye that the molten bath oscillates at a frequency of slightly more than 3 Hz, wherein the molten bath length oscillates by approximately 2 mm per modulation period.

The molten bath length SBL is defined by the distance between the front side of the vapor capillary and the molten bath end. The molten bath end is assumed to be at the location (with respect to the advance direction of the laser) of the heat radiation intensity profile (perpendicular to the advance direction) with the smallest half-width value. The minimum of the half-width value results from the acutely tapering molten bath shape and from the production of a wide heat track behind the molten bath. The establishment of the front side of the vapor capillary is carried out via the course of intensity in the advance direction and is defined by the location at which the maximum measurable intensity of the camera sensor is achieved for the first time.

Figure 5:
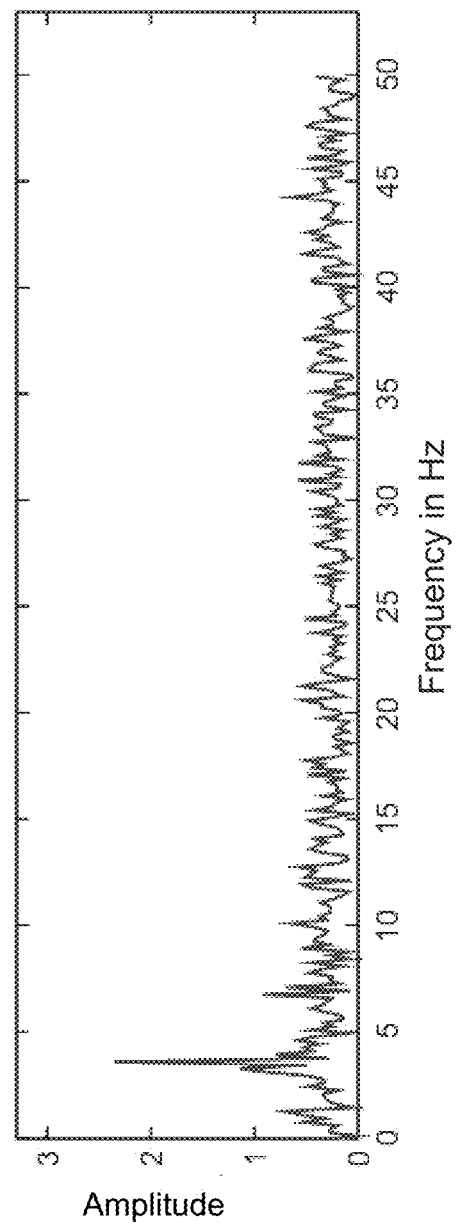
FIG. 5 is a graph illustrating the Fourier transformation of the data of FIG. 4, with the (Fourier) amplitude of the respective frequency component (on the y-axis) as a function of the frequency (on the x-axis).

In FIG. 5, a Fourier transformation of the molten bath length SBL of FIG. 4 is illustrated with frequency on the x-axis and the (Fourier) amplitude of the respective frequency component on the y-axis. At approximately 3.6 Hz the most powerful frequency component (peak) occurs, that is to say, the location in the Fourier spectrum with the largest (Fourier) amplitude. The (characteristic) oscillation frequency of the molten bath is at this frequency as a close approximation. The frequency determined in this manner can be used as a measurement variable for the frequency of the molten bath oscillation and can be used to determine a conclusion relating to the probability and/or frequency of occurrence of the appearance of hot cracks.

The mean amplitude of all the frequency components is in this instance approximately 0.3. In contrast, the amplitude at the frequency of the molten bath oscillation (peak at 3.6 Hz) is approximately 2.4. Consequently, a normalized amplitude can be calculated as a ratio of the monitored amplitude at the molten bath oscillation frequency and the mean amplitude of all the frequency components, of approximately 8. This normalized (Fourier) amplitude can be used as a measurement variable for the amplitude of the molten bath oscillation and in turn can be used to reach a conclusion relating to the probability and/or frequency of occurrence of the appearance of hot cracks.

Figures 6, 7:
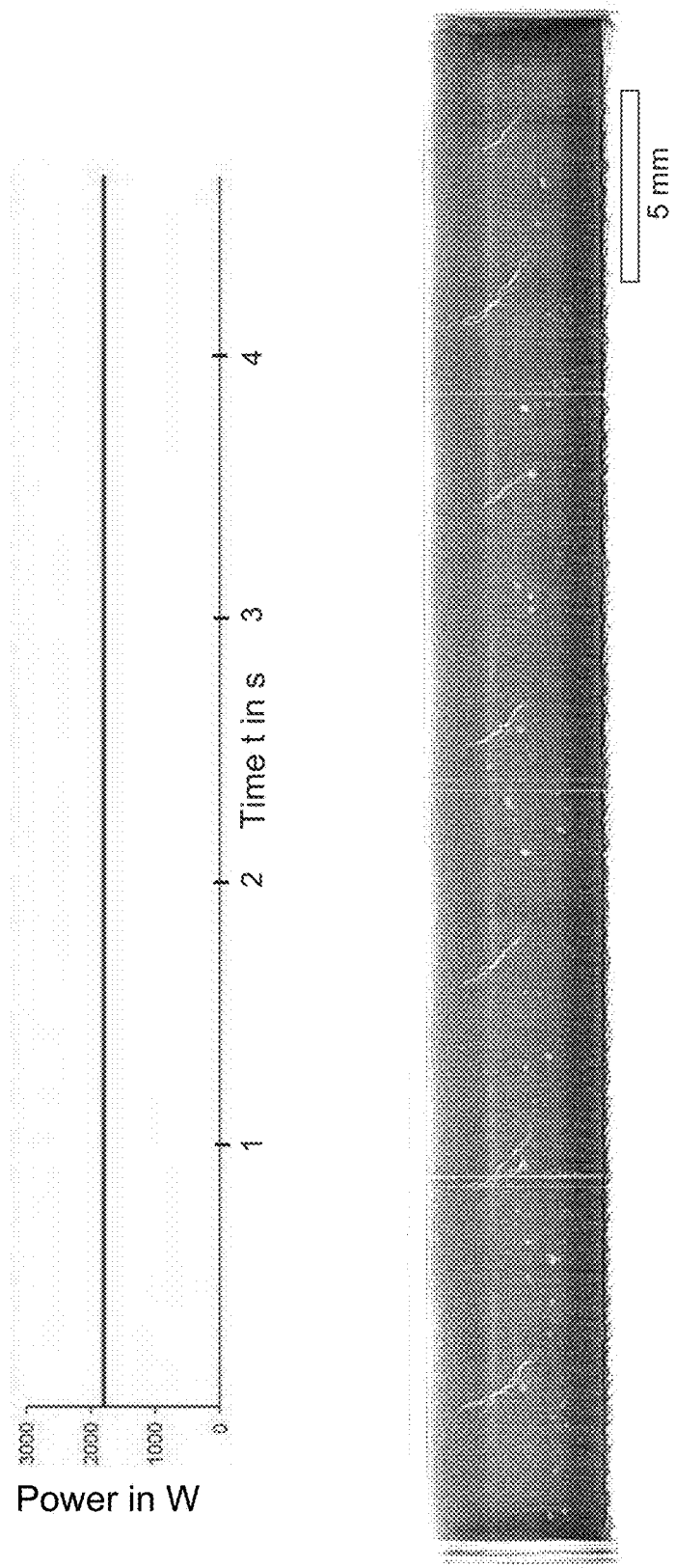
FIG. 6 is a graph illustrating the laser power (on the y-axis) as a function of time (on the x-axis) with the workpiece of FIG. 4.
FIG. 7 is an X-ray image of the workpiece of FIG. 4 laterally along the seam showing numerous hot cracks.

FIG. 6 shows the time progression of the laser power during the welding process of FIG. 4 which is constant at approximately 1800 W.

FIG. 7 shows an X-ray image of the welded workpiece of FIG. 4. A total of seven hot cracks can be clearly seen in the weld seam.

Figure 8:
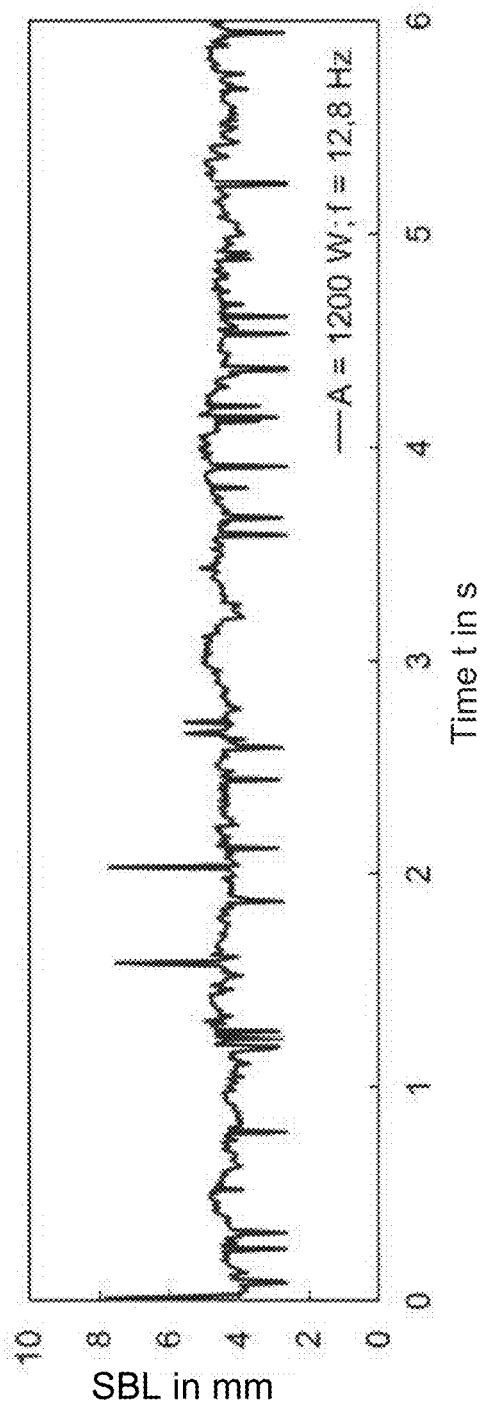
FIG. 8 is a graph illustrating an experimentally determined molten bath length (on the y-axis) as a function of time (on the x-axis) with a workpiece welded at an optimized, modulated laser power.

FIG. 8 shows the molten bath length SBL (on the y-axis) as a function of time (on the x-axis) of another workpiece welded similarly to the workpiece of FIG. 4, but welded with a sinusoidal power modulation of the laser, which was optimized for a minimum molten bath oscillation. Optimum production parameters have been found to include a modulation frequency of 12.8 Hz at an absolute modulation amplitude of 1200 W at the mean laser power ($P_{av}$) of 1800 W. The laser power consequently fluctuates between $P_{min}=600$ W and $P_{max}=3000$ W with a corresponding normalized modulation amplitude $\pi=1-P_{min}/P_{max}$ of 0.8. Notable molten bath oscillation can no longer be seen.

Figure 9:
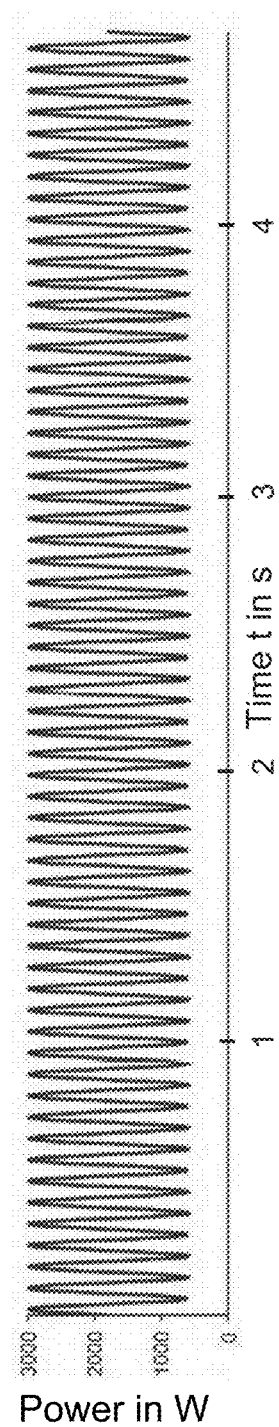
FIG. 9 is a graph illustrating the laser power (on the y-axis) as a function of time (on the x-axis) with the workpiece of FIG. 8.

FIG. 9 shows the laser power (on the y-axis) during the laser beam welding of FIG. 8 as a function of time (on the x-axis). The sinusoidal path, with $P_{min}=600$ W and $P_{max}=3000$ W, can be seen clearly.

Figure 10:
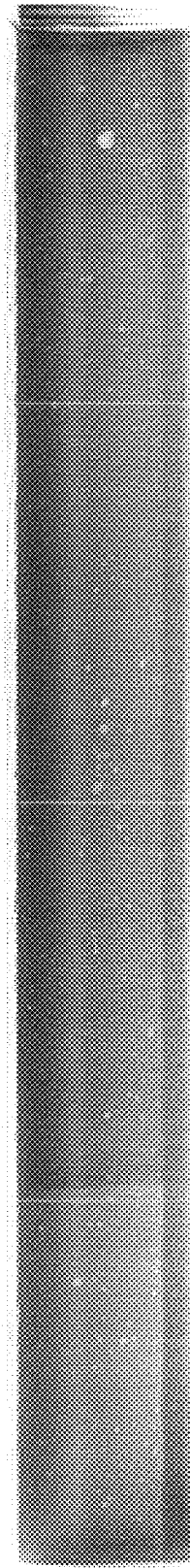
FIG. 10 is an X-ray image of the workpiece of FIG. 8 laterally along the seam, without hot cracks.

In FIG. 10, an X-ray image of the welded workpiece of FIG. 8 can be seen. There are no hot cracks in the weld seam. Occasionally, pores appear but hardly influence the strength of the weld seam.

Figure 11:
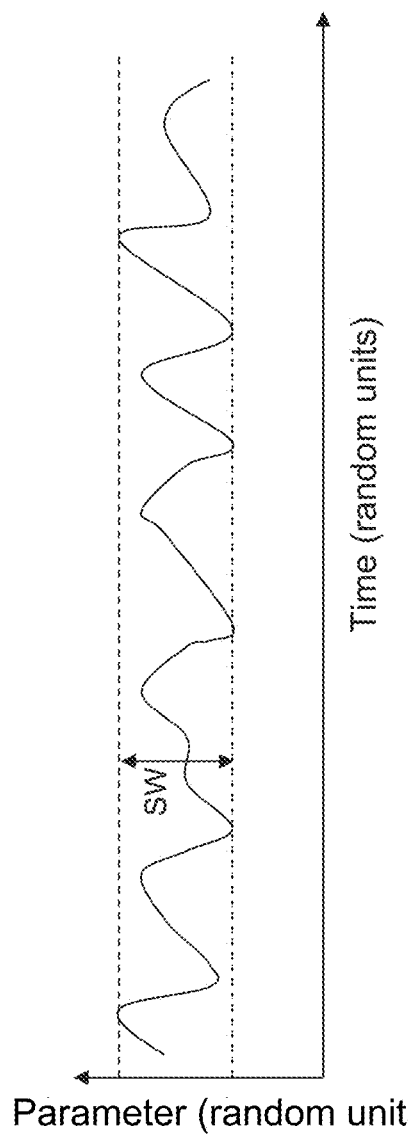
FIG. 11 is an exemplary graph illustrating a parameter for the amplitude of a molten bath oscillation (on the y-axis) as a function of time (on the x-axis) illustrating the fluctuation range.

FIG. 11 illustrates an alternative method for determining a measurement variable for the amplitude of the molten bath oscillation. On the y-axis is a parameter for the molten bath oscillation, for instance, the molten bath length, plotted as a function of time on the x-axis. The difference between the highest parameter value(s) and the smallest parameter value(s) of the weld seam is the range SW of the parameter values. This range can be used as a measurement variable for the amplitude of the molten bath oscillation. In practice, it may still be necessary to ignore individual measurement peaks which are based on measurement errors; such measurement peaks may, for example, be identified in that they occur only with a small proportion (for example, less than 20%) of the modulation periods.

Figure 12:
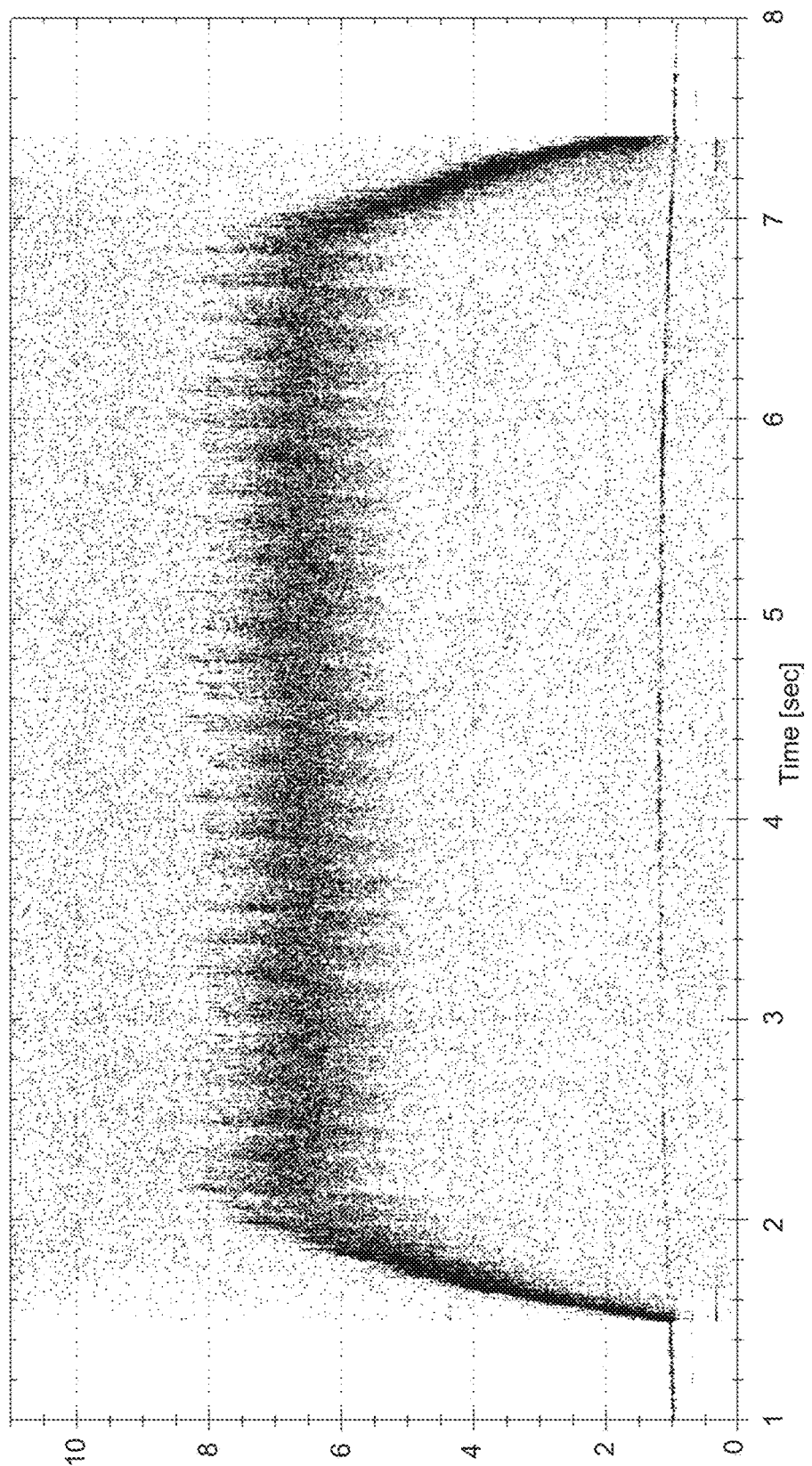
FIG. 12 is a graph illustrating a measured capillary depth (on the y-axis) as a function of time (on the x-axis) during laser beam welding of a workpiece, without power modulation.

FIG. 12 shows a capillary depth signal (on the y-axis) as a function of time (on the x-axis) for a laser welding process at constant laser power. It can be seen that a process-inherent frequency of approximately 6 Hz can be derived from the capillary depth signal; the capillary depth signal can be used as a parameter for the calculation.

Figure 13:
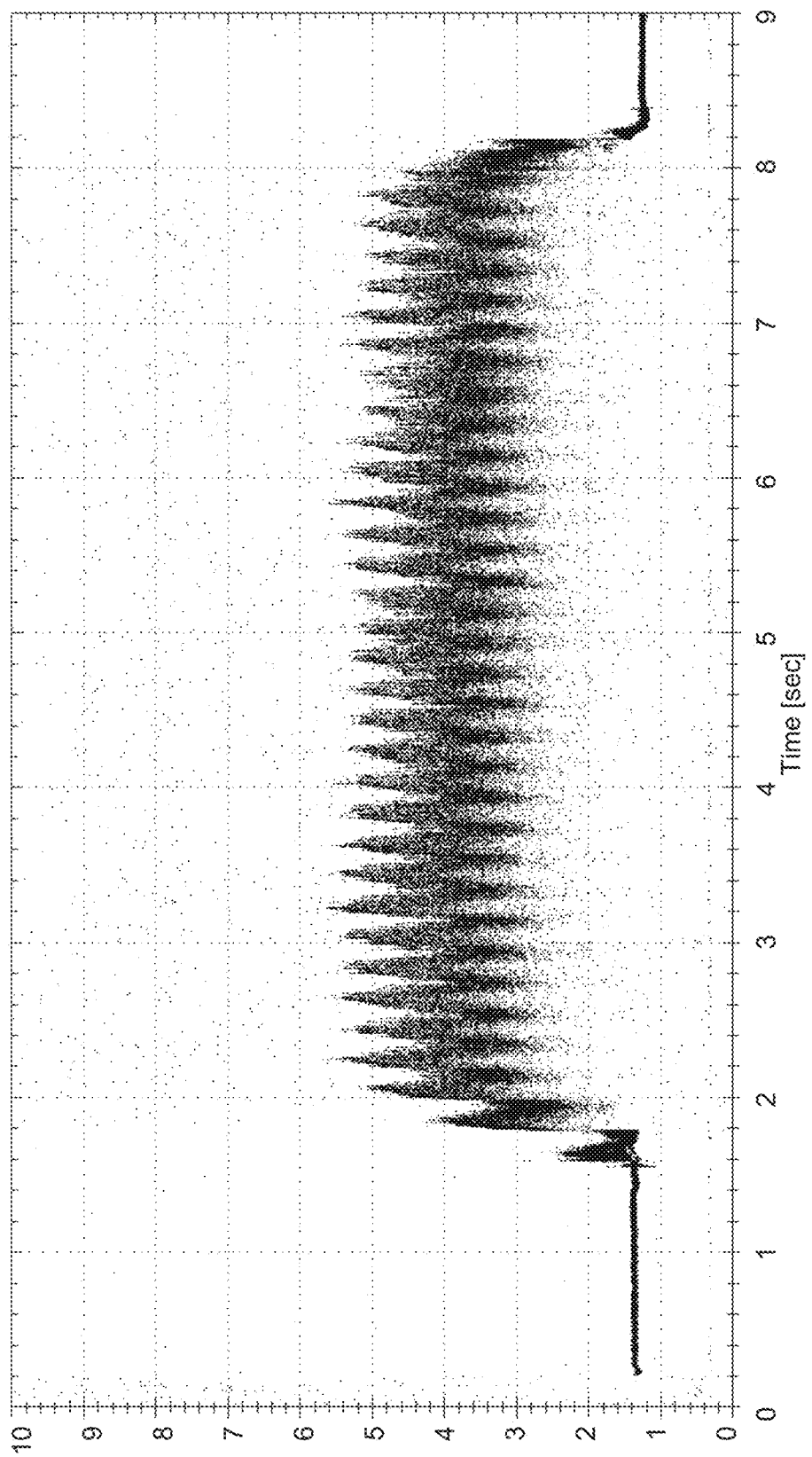
FIG. 13 is a graph illustrating a measured capillary depth (on the y-axis) as a function of time (on the x-axis) during laser beam welding of a workpiece, with power modulation.

In FIG. 13, the capillary depth signal (on the y-axis) is shown as a function of time (on the x-axis) in a welding process with modulated laser power, with a modulation frequency of approximately 5 Hz. The modulation is imprinted on the capillary depth signal so that the fluctuations of the capillary depth signal substantially correspond to the modulation. In this instance, another parameter for the determination of the actual resonant molten bath oscillation can be used.

Below, an example explains how, from the data of molten bath oscillations from previous tests, conclusions can be drawn relating to the probability and the frequency of occurrence of hot cracks in a workpiece.

For a workpiece type of interest, in prior tests different production parameters or production parameter combinations (typically primarily modulation frequencies and modulation amplitudes) of the laser beam welding were tested out on a plurality (in this instance 10) test workpieces. A parameter for the molten bath oscillation or the associated measurement variable for the amplitude and/or for the frequency of the molten bath oscillation, respectively, were recorded. Subsequently, the test workpieces were examined for the presence of hot cracks using conventional methods (for instance, the recording of X-ray images).

The following results were produced, in this instance with a fluctuation range of a molten bath length as a measurement variable for the amplitude (MGA) of the molten bath oscillation:

| Measurement variable amplitude (MGA) molten bath oscillation | Number of workpieces without hot cracks | Number of workpieces with hot cracks |
| --- | --- | --- |
| up to 1.0 mm | 10 | 0 |
| 1.1 to 2.0 mm | 10 | 0 |
| 2.1 to 2.5 mm | 8 | 2 |
| 2.6 to 3.0 mm | 3 | 7 |
| 3.1 to 3.5 mm | 0 | 10 |
| 3.6 mm and above | 0 | 10 |

Even without a more precise statistical evaluation, the following conclusions can be drawn from the data: with an MGA up to 2.0 mm hot cracks were observed anywhere in the weld seam; the probability for the occurrence of hot cracks seems to be close to 0%. On the other hand, with an MGA of 3.1 mm or more, hot cracks were always observed so that the probability for the occurrence of hot cracks seems to be close to 100%. A threshold value of 2.0 mm for MGA can therefore be considered to be a type of safe limit for crack-free workpieces (a safety threshold value). On the other hand, at a threshold value of 3.1 mm, a limit is exceeded at which there is always the risk of hot cracks (a saturation threshold value). For mean MGA values between 2.1 mm and 3.0 mm, hot cracks occasionally occur; the probability can be estimated from the test results (in this instance, for an MGA of from 2.1 to 2.5 mm approximately 20% risk of hot cracks, for an MGA of from 2.6 to 3.0 mm approximately 80% risk of hot cracks). For precise probability values, the number of test workpieces should be sufficiently large.

With the data obtained from the test workpieces or probabilities and/or frequencies of occurrence, respectively, for workpieces that have been produced with different combinations of production parameters as compared to the test workpieces but that gave similar measurement variables for the amplitude and/or the frequency of the molten bath (in this instance, MGA values), the quality of the weld seam can be estimated, without need for examining these workpieces with conventional methods (for instance, recording X-ray images). For example, with a workpiece assessed with an MGA of 1.4 mm, it can be assumed that it will have no hot cracks. With a workpiece which has an MGA of 3.4 mm, it can be assumed that it will have hot cracks.

In relation to the frequency of occurrence of hot cracks, the simplest information is the number of hot cracks per workpiece length. This frequency of occurrence generally correlates in an almost directly proportional manner to the oscillation frequency of the molten bath since, with each oscillation passage, a hot crack may occur as a result of the solidification processes. Therefore, it is often advantageous to minimize the oscillation frequency of the molten bath as long as this is possible by suitable production parameters. However, it should be noted that with a probability for the appearance of hot cracks of close to 0%, the frequency of occurrence is generally irrelevant.

Combined information relating to the probability and frequency of occurrence of hot cracks can be obtained from the relative crack length in a weld seam, that is to say, the proportion of the overall length of a weld seam containing cracks. The relative crack length is typically entered in a matrix of the measurement variable for the amplitude and the measurement variable for the frequency of the molten bath oscillation.

Generally, the knowledge of safety threshold values (e.g., for the measurement variable of the amplitude of the molten bath oscillation, but also for the measurement variable of the frequency of the molten bath oscillation, or corresponding combinations) is relevant to produce crack-free workpieces.

When a production process of a workpiece is to be optimized, the production parameters from workpiece to workpiece can be changed and, with reference to the molten bath oscillation observed during the production, it can be verified how the tendency for cracking changes. In this instance, optimization is generally carried out with respect to a minimization of the measurement variable for the amplitude of the molten bath oscillation.

It is also conceivable to control the welding process during the laser welding of a workpiece, wherein the measurement variable for the amplitude of the molten bath is minimized. This may, with rapidly changing external factors, such as a material composition which fluctuates from workpiece to workpiece or in the workpiece, lead to an improvement of the weld seam quality. It should be noted that for this procedure, typically the tendency for cracks is checked for the most recently produced weld seam portion (and not the entire previously produced weld seam).

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining quality of a weld seam of a workpiece welded by laser beam welding along the weld seam, the method comprising:

monitoring, with a measuring system during a laser beam welding operation, at least one parameter that correlates to a molten bath oscillation of a molten bath during the laser beam welding operation;

establishing, from the at least one parameter, a measurement variable for an amplitude of the molten bath oscillation, or a measurement variable for a frequency of the molten bath oscillation, or both a measurement variable for an amplitude of the molten bath oscillation and a measurement variable for a frequency of the molten bath oscillation;

determining a probability or a frequency, or both a probability and a frequency, of occurrence for an appearance of hot cracks in the weld seam of the workpiece from the measurement variable for the amplitude of the molten bath oscillation, or the measurement variable for the frequency of the molten bath oscillation, or from the measurement variable for the amplitude and for the frequency of the molten bath oscillation; and determining quality of the weld seam of the workpiece based on the probability or frequency, or based on both the probability and the frequency, of occurrence for the appearance of hot cracks in the weld seam.

2. The method of claim 1, wherein determining the probability, or frequency, or both the probability and the frequency, of occurrence for the appearance of hot cracks comprises comparing the measurement variable for the amplitude of the molten bath oscillation with at least one threshold value, and if the measurement variable for the amplitude of the molten bath oscillation is above a saturation threshold value, determining that a hot crack occurs in the workpiece per amplitude maximum.

3. The method of claim 1, wherein the laser beam welding has a laser power that is modulated at a modulation frequency and a modulation amplitude $\pi=1-P_{min}/P_{max}$, where $P_{min}$ is a minimum laser power and $P_{max}$ is a maximum laser power during a modulation period.

4. The method of claim 3, wherein the laser power is modulated with a sinusoidal form approximated by at least 12 base points per modulation period.

5. The method of claim 4, wherein the sinusoidal form is approximated by at least 18 base points per modulation period.

6. The method of claim 1, wherein the workpiece is steel.

7. The method of claim 1, wherein the at least one parameter comprises a geometric size of the molten bath.

8. The method of claim 7, further comprising detecting the geometric size of the molten bath with a camera.

9. The method of claim 7, wherein the geometric size is a molten bath length, a molten bath width, or a molten bath surface-area.

10. The method of claim 1, wherein the at least one parameter comprises a local temperature in the molten bath or in a heat track of the molten bath at a location on the workpiece fixedly positioned and spaced apart with respect to a laser beam focal spot.

11. The method of claim 10, wherein the local temperature is detected by a pyrometer or a thermal imaging camera.

12. The method of claim 1, wherein the at least one parameter comprises a geometric size of a weld capillary over a laser beam focal spot, and the geometric size of the weld capillary is determined using a measurement beam and a white light interferometer.

13. The method of claim 1, further comprising subjecting the monitored at least one parameter to a Fourier transformation.

14. A method for optimizing one or more production parameters of welded workpieces, the method comprising:
- welding a plurality of workpieces along a weld seam by laser beam welding;
- producing the workpieces using different values of a production parameter or value combinations of a plurality of production parameters;
- determining the probability or the frequency, or both the probability and the frequency, of occurrence for the appearance of hot cracks in the weld seam in accordance with claim 1 for each workpiece;
- establishing at least one best workpiece from the plurality of workpieces by determining which value or value combination corresponds to a lowest probability or a lowest frequency, or both the lowest probability and the lowest frequency, of occurrence for the appearance of hot cracks in the weld seam;
- using the value or the value combination of the best workpiece as a basis for determining optimum production parameters.

15. The method of claim 14, wherein the laser beam welding has a laser power which is modulated at a modulation frequency and a modulation amplitude $\pi = 1 - P_{min}/P_{max}$, where $P_{min}$ is a minimum laser power and $P_{max}$ is a maximum laser power during a modulation period, and different value combinations of the modulation frequency and modulation amplitude are used as production parameters for different workpieces.

16. The method according of claim 14, wherein the best workpiece is established by the workpiece with the smallest measurement variable for the amplitude of the molten bath oscillation.

* * * * *